Aug. 23, 1966

B. O. WEINSCHEL 3,268,808

SYNCHRONOUS DIFFERENTIAL NULL DETECTOR
FOR MICROWAVE MEASUREMENTS

Filed March 21, 1963

INVENTOR
Bruno O. Weinschel

BY Max L. Libman
ATTORNEY

INVENTOR
Bruno O. Weinschel

BY Max L. Libman
ATTORNEY

INVENTOR
Bruno O. Weinschel

BY

ATTORNEY

Aug. 23, 1966  B. O. WEINSCHEL  3,268,808
SYNCHRONOUS DIFFERENTIAL NULL DETECTOR
FOR MICROWAVE MEASUREMENTS
Filed March 21, 1963  4 Sheets-Sheet 4

INVENTOR
Bruno O. Weinschel

BY  *Max L. Libman*
ATTORNEY

United States Patent Office 3,268,808
Patented August 23, 1966

3,268,808
SYNCHRONOUS DIFFERENTIAL NULL DETECTOR
FOR MICROWAVE MEASUREMENTS
Bruno O. Weinschel, Bethesda, Md., assignor to Weinschel Engineering Co., Inc., Gaithersburg, Md., a corporation of Delaware
Filed Mar. 21, 1963, Ser. No. 266,955
13 Claims. (Cl. 324—58)

This invention relates to a system for making microwave measurements such as attenuation and VSWR measurements with very high precision and accuracy. Specifically, the invention relates to a dual-channel system for making such measurements with a higher degree of accuracy than has heretofore been possible.

The most common method of measuring attenuation uses a single channel system. This is a single line of microwave plumbing terminated in a barretter mount. The barretter is a square-law detector which means that when properly biased with D.-C., and when the R.-F. power is audio modulated, it will produce an audio output voltage which is proportional to the R.-F. input power. The R.-F. generator is 100% square-wave modulated by an audio signal, usually 1,000 c.p.s. The output of the measurement channel barretter is fed into an attenuator calibrator which typically consists of a variable audio attenuator and an amplifier. Since the audio output voltage is proportional to the R.-F. input power, a change of R.-F. input power of, for example, 10 db, which may be caused by the insertion of a 10 db attenuator, will drop the audio output voltage by a factor of 10, which in terms of audio output voltage is 20 db; this voltage drop will be proportional to the change in R.-F. input power. The output of the attenuator calibrator is measured by means of a meter, and before the attenuator to be measured is inserted, the amplifier is adjusted as to gain until the meter shows a convenient reading, somewhere high up on the scale.

To make such a measurement, attenuation is inserted in the audio attenuator to correspond to any anticipated R.-F. attenuation which will be put into the measurement channel. The unknown R.-F. attenuator is then inserted, which produces a drop in the audio output voltage, and the adjustable attenuation in the measurement channel is again decreased in the audio attenuator until the meter reading returns to its initial value. Obviously, if the barretter works as a true square-law detector, the audio attenuation divided by two should be exactly equal to the R.-F. attenuation.

However, there are two important short-comings in the above-described known system: First, the possible accuracy is limited by resolution—the meter cannot be reset more accurately than its own inherent accuracy and precision of construction make possible, typically in the order of 0.5 percent for the best meters, which is equivalent to about 0.05 db. This establishes the limit of resolution at best at about 0.02 db. The second and even more difficult problem is that the power output stability of the R.-F. generator is a first-order effect, i.e., if attenuation is inserted and the generator output changes during this time, then the output of the attenuator amplifier will also change and produce an error.

It is therefore desirable to have a system which has the characteristics of a bridge system, in which one compares the unknown with the known in such a way that the actual voltage of the generator feeding the bridge is not a factor in the measurement; this, for example, is true of a Wheatstone bridge. In such a bridge, if the supply voltage varies within reasonable limits, only the sensitivity may change a little, but usually not to any significant degree. Such a system has been developed for R.-F., and is generally referred to as a "dual channel system," in which a reference channel is added to the single channel above described; the reference channel has a similar barretter mount for the R.-F. termination, the R.-F. voltage being amplified by an attenuator amplifier as above described, and now the two audio voltages are fed into a differential amplifier, the output of which is supplied to a null-indicating meter.

Obviously, if now the phases of the two audio signals coming respectively from the barretter mount in the measurement channel and the barretter mount in the reference channel can be adjusted so as to bring them into phase (actually, phase opposition), and the amplitude difference between the two is adjusted to zero, then the differential amplifier will have no output, since it now indicates the difference between two equal and opposed signals. If there is a small unbalance, this can now be strongly amplified by suitable means such as a galvanometer amplifier or an instrument of equivalent sensitivity and then fed into a difference meter to provide a system in which both of the above disadvantages are minimized. In the first place, the resolution depends entirely on the unbalance amplifier, and the gain of this can be increased to greatly increase the resolution, up to one thousandth of a db. In the second place, when the R.-F. output changes, both audio signal inputs change in the same manner so the balance is not disturbed in the differential amplifier.

Assuming, for example, that both audio outputs are 1.0 volt, and that the power drops to produce a level of 0.8 volt in one channel, then that in the other channel will also drop to 0.8 volt and the balance is maintained. However, the above system is still limited in its inherent accuracy by the presence of noise, as will be shown below, and it is a major object of the present invention to provide an improved system of the above-described type, which will still further greatly increase the accuracy of the system by the use of synchronous detection, in a system which takes advantage of the phase cancellation in the above-described system to provide a suitable gating or reference voltage for use in synchronous detection in order to greatly reduce the inaccuracy due to such noise.

The specific nature of the invention, as well as other objects and advantages thereof, will clearly appear from a description of a preferred embodiment as shown in the accompanying drawings, in which.

Figure 7:
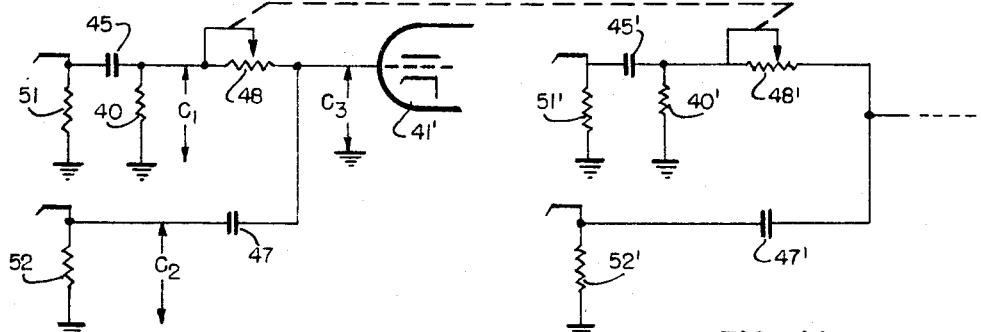
Figures 1A, 8:
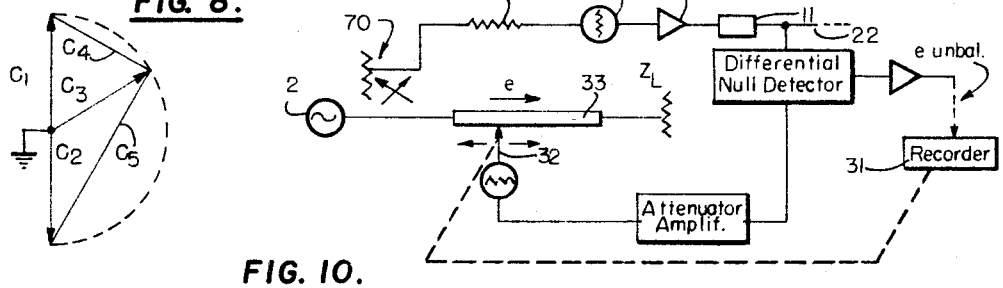
FIG. 1a is a similar, but somewhat simplified block diagram showing the manner in which the invention is used to make VSWR measurements.
Figure 10:
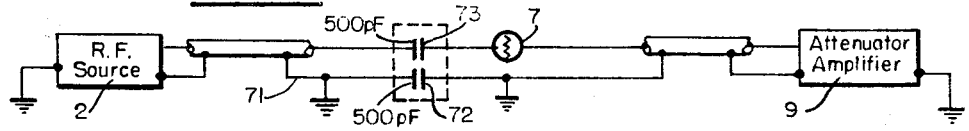
Figure 9:
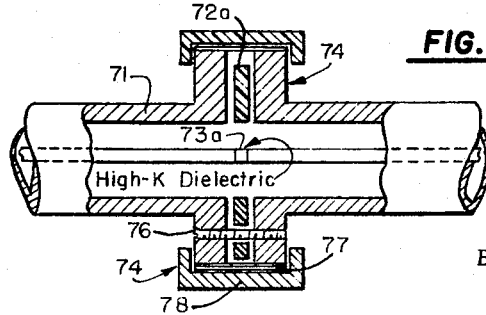
Figure 6A:
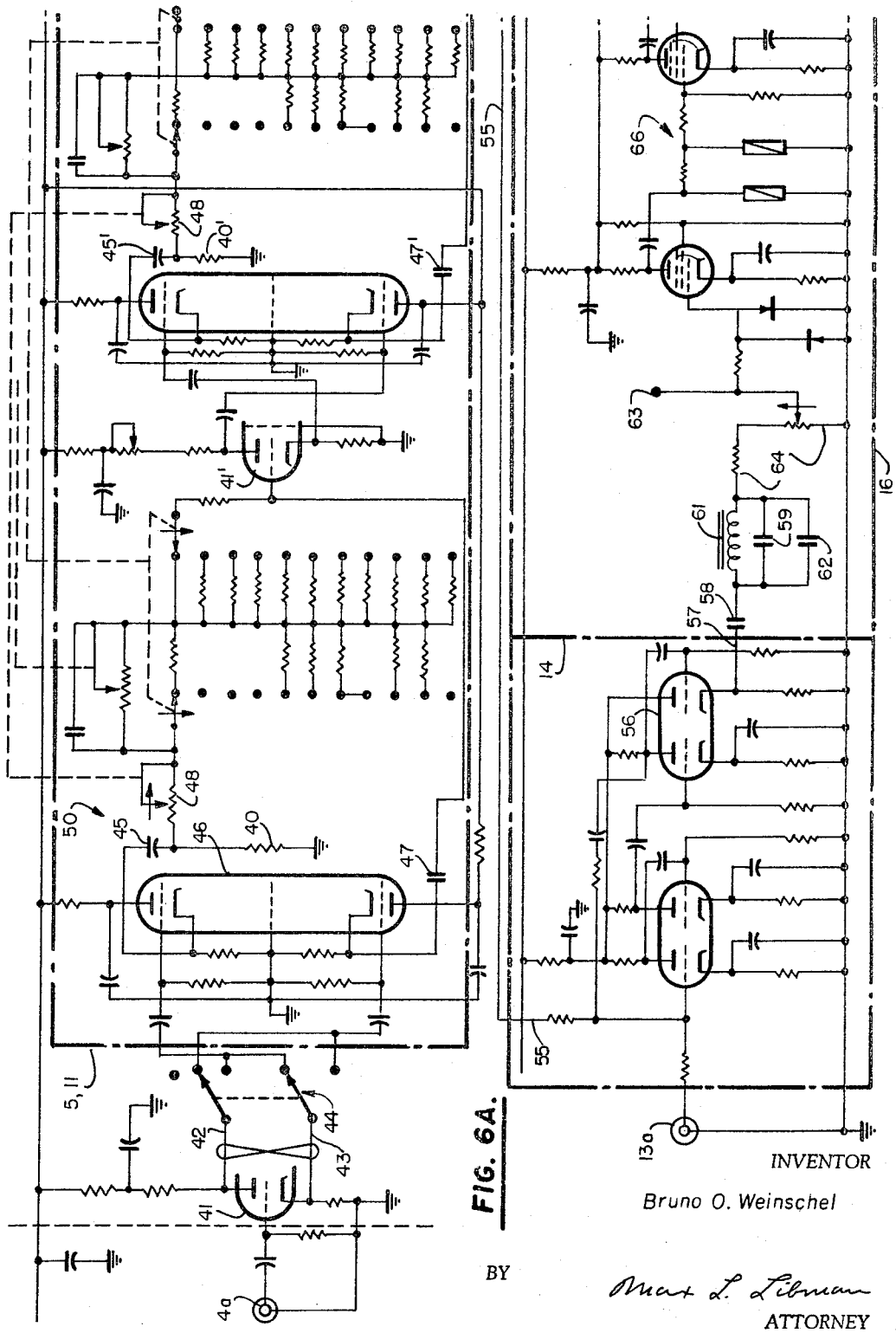
Figure 6B:
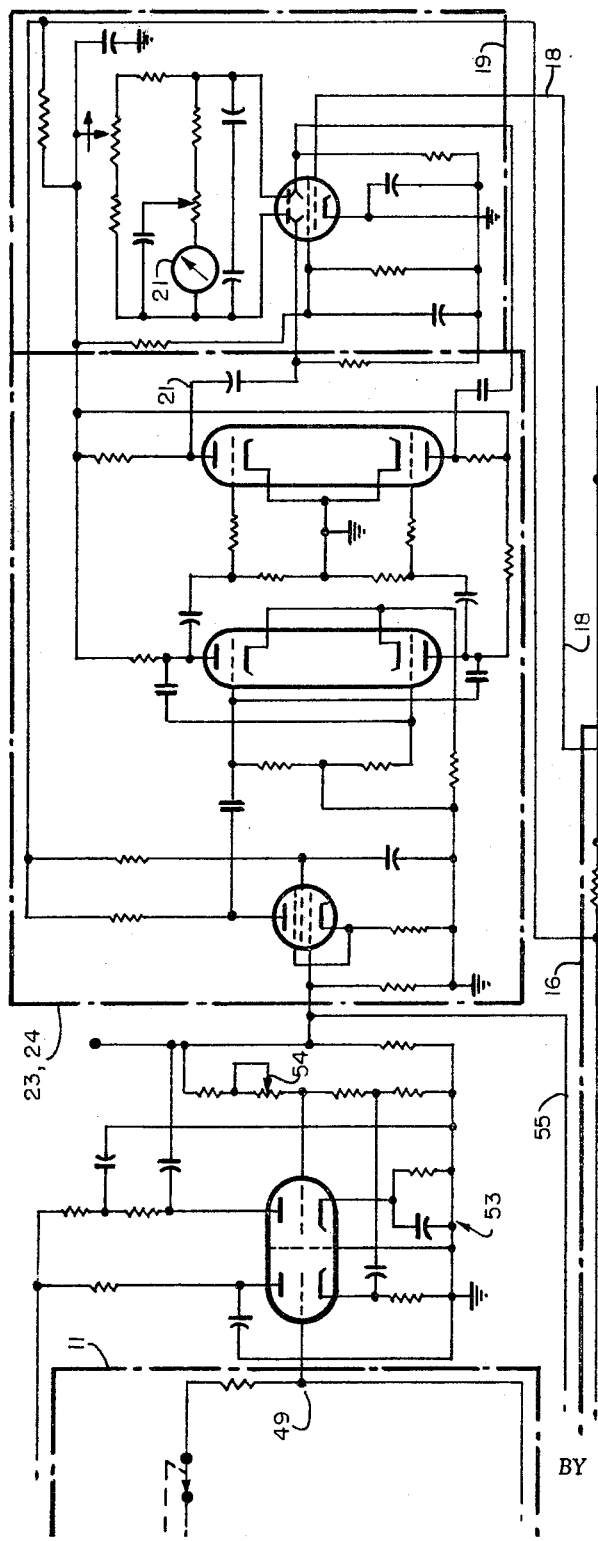
Figure 6B:
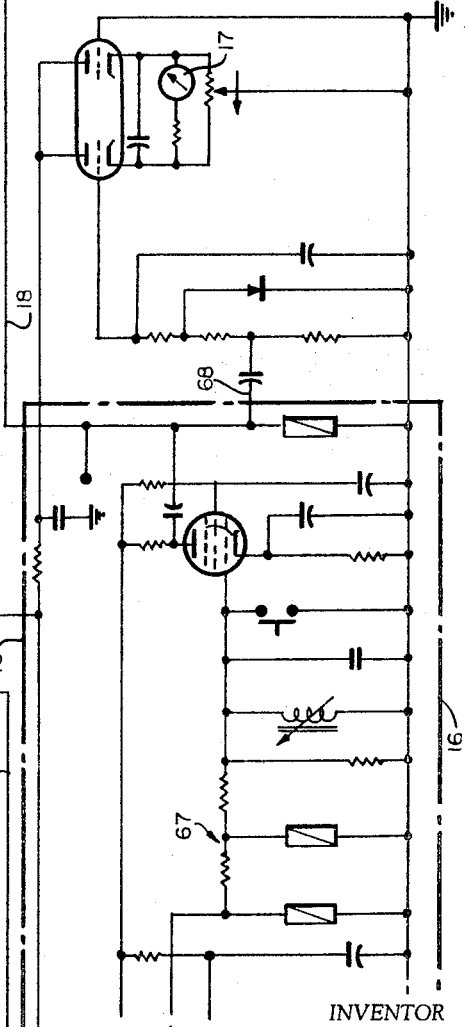

FIGS. 6A and 6B, constituting together FIG. 6, are a schematic circuit diagram of the essential components of the invention;

FIG. 7 is a simplified schematic circuit diagram of a portion of FIG. 6, showing the phase adjusting circuit;

FIG. 8 is a vector diagram used in explaining the operation of FIG. 7;

FIG. 9 shows the physical construction used to prevent circulating ground currents; and FIG. 10 shows the circuit relationship of the elements of FIG. 9.

Figure 1:
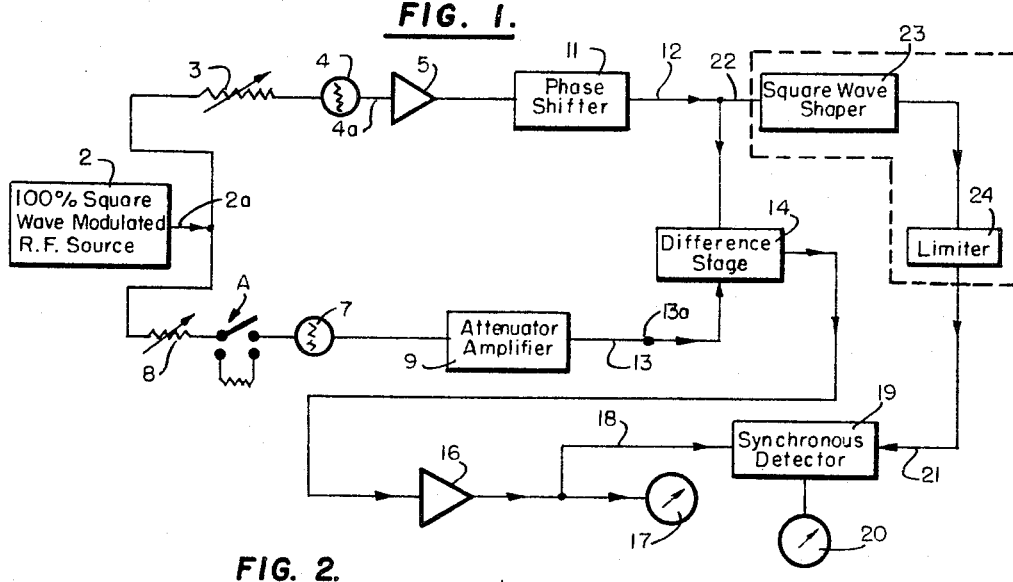
FIG. 1 is a block diagram of the invention as used to make attenuation measurements.

Referring to FIG. 1, a measurement system according to the invention typically includes an R.-F. generator 2, square-wave modulated at a convenient audio frequency, typically 1,000 c.p.s., to produce a square-wave audio modulated R.-F. signal on line 2a, which is now supplied to two channels in parallel, as explained above, one being a reference channel and the other a measurement channel. The reference channel contains a variable attenuator 3, a barretter 4, and an amplifier 5; the measurement channel contains attenuator 8, barretter 7, and attenuator amplifier 9, of variable gain. The outputs of these two channels are fed on lines 12 and 13, respectively, to a difference stage 14, where they are combined in opposition, by means which will be described in more detail below. A phase shifter 11 is shown in the reference channel, but it will be apparent that this could equally well be inserted in the measurement channel. The output of difference stage 14, which is the difference between the two signals on lines 12 and 13, respectively, is fed through amplifier 16 to an unbalance indicator 17, the purpose of which will be described below. The output of amplifier 16 is also fed through line 18 to the synchronous detector 19. The gating or reference voltage for the synchronous detector is supplied on line 21 from the reference channel input to the difference stage 14, by tapping line 22 off from line 12. This gating signal is passed through square-wave shaper 23 and limiter 24, to provide a reference signal which is not affected by the value on line 12, but is determined as to frequency and phase by the audio-frequency output of phase shifter 11.

Figure 2:
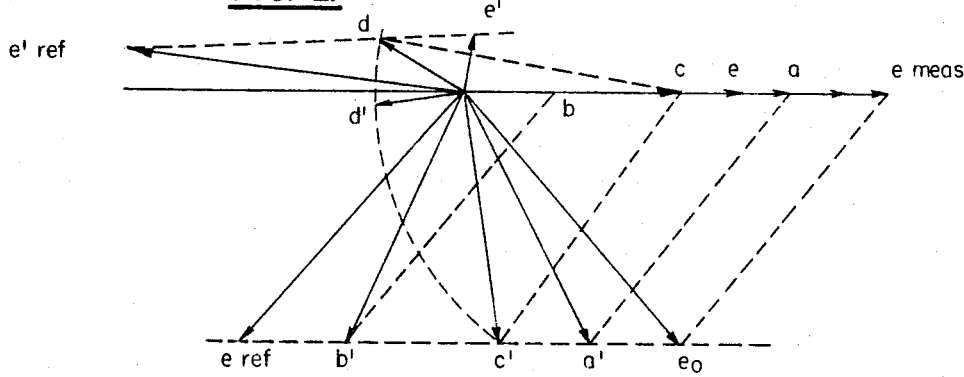
FIG. 2 is an explanatory vector diagram showing the voltage relations during successive adjustments.

As will be apparent from FIG. 1 and from the preliminary discussion, the values in the reference channel having been set as to amplitude by the setting of the attenuator 3, amplifier 5, and the characteristics of barretter 4, it is desired to vary the attenuator amplifier 9 until the voltage on line 13 is exactly equal and opposite to that on line 12. Of course, in order to obtain a null reading, the two voltages must also be out of phase, and phase shifter 11 is provided for this purpose. The unbalance indicator 17 serves for preliminary setting of the circuit in order to obtain as small a difference value as possible, after which a synchronous detector 19 can be employed for the final measurement as will be described below. FIG. 2 will be used to explain the principle by which this is accomplished.

Assuming initially that the phase relationship and amplitude values of the measurement voltage in line 13 and in the reference voltage in line 12 are represented as shown in FIG. 2 by $e_m$ and $e_r$ respectively, then the resultant output voltage will be represented by $e_o$. It is desired to adjust the amplitude of the measurement voltage by attenuator amplifier 9, and to adjust the phase of $e_r$ by phase shifter 11, until the difference is as near to zero as can be obtained in this manner. Assuming the attenuator amplifier 9 is adjusted so that the vector representing it assumes the position shown at $a$, it will be apparent that the resultant voltage $e_o$ will assume the value shown at $a'$, which is smaller in amplitude than the initial value, and this will be shown on the unbalance indicator 17. Since it is desired to obtain a minimum, the value of $e_m$ is still further reduced, for example to point $b$, in which case the resultant will have the value shown at $b'$. It will be noted, however, as the value is being reduced from $a$ to $b$, it passes through the value shown at $c$, and in this region the resultant $c'$ is at a minimum value, since $b'$ is greater than $c'$. The amplitude of $e_m$ is therefore adjusted as nearly as possible to give this minimum value, which will be in the region shown at $c$; it is not possible to set this value with great accuracy, because it will be apparent from inspection of the vector diagram that $c'$ varies very little in the region where the value of $e_m$ is approximately equal to $c$; for the present example it will be assumed that the final adjustment is made to point $c$ as shown in FIG. 2.

The operator now turns to the phase shifter 11 and adjusts this to obtain a still smaller minimum. It will be apparent that as $e_r$ is phase shifted to the position shown at $e'_r$, the resultant vector of $e_m$ and $e'_r$ moves through the arc $c'$ $d'$ to a minimum value, and then again begins to increase. However, the exact value of the minimum is again difficult to determine because the resultant minimum value is not very sharp; it is assumed that the best the operator can do will be to leave the phase shifter at the setting corresponding to the position of $e'_r$ shown, where the value of the resultant is represented by $d$. This difference is essentially due to the difference in amplitude between $e_m$ and $e_r$, and the amplitude can now be adjusted as in the initial step to still further reduce the error, after which the phase can again be adjusted, and so forth.

Figure 4:
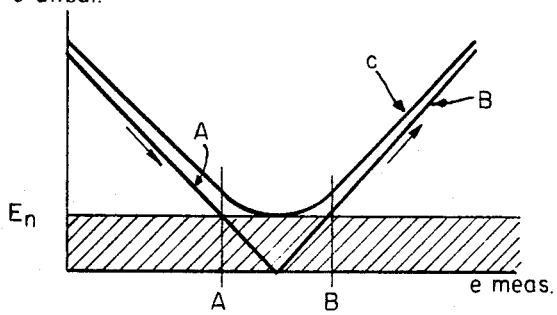
FIGS. 4 and 5 are graphs used in explaining the principle of the invention.

It will be apparent that by this method a rapid convergence toward the most accurate possible setting is obtained. However, the accuracy of this system is still limited by an inherent noise factor, as illustrated in FIG. 4, which is a graph of the unbalance voltage product against the change only of the measurement voltage $e_m$. Assuming that in each instant the phase is adjusted, as above, as closely as possible, the curve A is theoretically obtained. As $e_m$ is increased from zero, the unbalance diminishes to a minimum (theoretically zero) and then increases along curve B, as explained in the foregoing discussion. In the region where values of $e_m$ are small, the curve will be essentially a straight line, which will theoretically descend to zero at the point where $e_m$ and $e_r$ are equal. However, in practice, there is a minimum amount of noise $E_n$, which is part of the signal coming from the measurement channel, and which obviously swamps the desired signal when its level is approximately equal to the noise level. Therefore, the actual curve more nearly resembles that shown at C in FIG. 4, and there is an area of uncertainty in the region A-B, so that the true value of the minimum point cannot be determined. The audio voltages out of the barretters are in the millivolt or microvolt range, and since the barretter is a noise source, as are the amplifiers, supplying both thermal noise and hum, there will always be a certain minimum noise level accompanying the measuring signal. With the system above described, measurements can therefore not be made with resolution lower than that determined by the noise level.

In order to eliminate this effect, the present invention makes use of synchronous detection. However, the use of synchronous detection in a measurement system which involves a phase adjustment would appear to introduce difficulties because a synchronous detector is itself a phase-control system, since it gates in, on the average, only signals which are in phase with the reference gating system; this introduces a problem because the output of the synchronous detector is not only proportional to the amplitude of the unbalance signal, but also the phase relation between the unbalance signal and the reference signal used in the synchronous detector.

Figure 5:
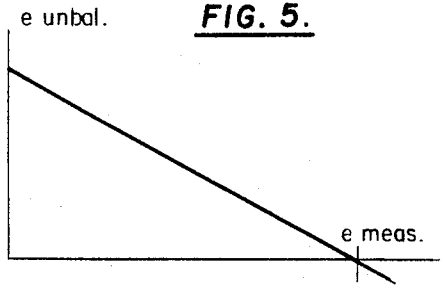

A major advantage of the present invention lies in this: Since we do adjust the phase between a reference signal and a measurement signal to be at a point where the unbalance is small, at this point the two voltages are closely in phase, we can make use of the adjusted reference signal after it has been preliminarily balanced as above described, to provide the gating signal for the synchronous detector. This is done in FIG. 1 by elements 23, 24 and 19. The output for synchronous detector reference is taken from a point in the circuit following the phase shifter and ahead of the differential stage, on line 22, which now can be used as a gating signal for the synchronous detector, but can also be taken from any point where the signal is coherent with the phase shifter output. This is also a reference signal, but in a different sense from the reference signal provided by the reference channel to the difference stage. Since this signal is shaped and limited by elements 23 and 24, its amplitude is not made use of in the synchronous detection circuit, but only its phase, which is not significantly altered by this operation. The unbalance indicator 17 is used as above described in order to first obtain as close a balance as is possible with this circuit; in the course of this procedure, the phase of the reference channel signal with the respect to the measurement channel signal is quite accurately fixed, for all practical purposes, so that after this procedure has been completed, it is now possible to use the reference channel signal as a phase reference for the synchronous detector circuit. There is thus a cross-correlation between the "rough" and the "fine" measurement. When the unbalance meter 17 shows zero or a sharp minimum, due to the adjustments of the phase shifter, this indicates that the phase between the reference signal and the unbalance signal is either at 0° or 180°, as required for use of the synchronous detector. In a practical circuit for this purpose, a phase shifter switch is provided to reverse the relative phase of the reference channel with respect to the measurement channel by 180°, since this adjustment must initially be made in order to insure that $e_m$ and $e_r$ are in phase opposition at the point where the comparison is made so that as they are adjusted, a zero or minimum difference can be obtained. The square-wave shaper 23 and limiter 24 insure that the output of the synchronous detector is independent of the amplitude of the reference input, that is, the reference signal, after the phase shifting, is limited and clipped so that any change in input amplitude does not effect sensitivity of the synchronous detector into which the unbalance signal is fed. If a curve equivalent to FIG. 4 is again plotted for the system of FIG. 1 as measured by the synchronous detector, the unbalance signal versus the $e_m$ signal will now be, as shown in FIG. 5, a straight line going through zero and extending on the other side into the negative region, since the synchronous detector is able, due to its phase relationship to the reference signal, to indicate whether the unbalance signal is in phase (positive) or, if the phase shift is 180°, that shows that the unbalance signal is a negative value signal, which means that the reference signal is greater than the measurement signal. Thus the synchronous detector also provides a means of detecting the polarity of the measurement signal with respect to the reference signal.

It will be understood that by use of a synchronous detection system, the noise is greatly reduced, since only signals which are in phase with the reference signal or with the measurement signal contribute to the output, and this is only a very small fraction of the previous noise output since the noise signal is not a coherent signal and averages out to a degree depending on the value of the time constant of the synchronous detection system. Of course, this increased accuracy and range are gained at the expense of time. A variable time constant adjustment is therefore provided, as will be shown below, so that the shortest time constant consistent with the minimum desired accuracy can be selected, if speed of measurement is a factor, as it may be, for example, in a production line situation.

In using the present system, the most common measurements made are insertion loss measurements. This is defined as the power dissipated in a load connected directly to a generator, divided by the power dissipated into the same load with the device inserted between the generator and the load, whose insertion loss is to be measured. The generator is rather liberally defined as the entire assembly which supplies the line 2a in FIG. 1. It may include directional couplers, isolators, limiters, etc. Its output impedance is that which appears at the point of connection of the generator with the line 2a, or more accurately, if the line 2a is broken and one looks to the left, what one sees is the output impedance of the generator; looking to the right, one sees the input impedance of the load. The insertion loss depends upon both of these impedances, since they are not in practice perfectly matched. It is, of course, desirable to match these as closely as possible to the transmission line being employed.

Referring to FIG. 1, the load is represented by the barretter 7. In a practical circuit, the barretter would ordinarily have a small tuner (i.e., a double-stub tuner) ahead of it for impedance matching, or it might have been initially pre-tuned or adjusted for the proper impedance. The barretter 7 will develop an audio output voltage which is proportional to the R.-F. input power. In taking a measurement, one establishes a typical audio level at the output of the attenuator amplifier 9 of perhaps 0.5 volt, giving the value $e_m$ on line 13. Since this audio voltage is proportional to the R.-F. input power, if the element whose attenuation is being measured is now inserted in the line, the voltage $e_m$ will drop by a factor related to the inserted attenuation. The element is inserted between elements 7 and 8 at the point marked A. This is so because the audio voltage developed by the barretter 9 decreases in accordance with the power fed into the device, which has now been reduced by the added attenuation. This drop in voltage of course destroys the balance previously attained as explained above. Therefore, the audio attenuator in the attenuator-amplifier 9 is now again adjusted by decreasing its value until a balance is again attained. The voltage on line 13, $e_m$, is now back again to its original value at balance. By noting the value of the reduction in attenuation of the amplifier 9 which must be proportional to the value added by the inserted device, it is possible to obtain a measure of the attenuation of the inserted device.

The system can also be used for making VSWR measurements as shown in FIG. 1a. The recorder 31 is mechanically linked to the probe 32 so as to give a record of the unbalance voltage on line 33 plotted against distance of the probe along the length of the slotted line. Such a record will give a value of the VSWR directly by visual inspection, if the record is suitably calibrated graphically. However, the accuracy of the record is inherently limited by the accuracy of measurement of the probe voltage, and by use of the arrangement shown in FIG. 1a, which is essentially the same as the system of FIG. 1 adapted for use with a slotted line, the same advantages and improvements in accuracy can be obtained.

In making VSWR measurements, an upper limit of accuracy is often determined by extraneous factors such as an imperfect slotted line, variation of probe coupling as the probe is moved along the slotted line, variation of thickness or evenness of the line itself, etc. However, such variations are not periodic, i.e., they do not recur according to a regular pattern as the probe is moved along the slotted line, while the standing wave effect which is being measured does have a periodic character, and therefore can be picked out of the non-periodic variations even though the latter may be of the same magnitude or even greater by a full magnitude. In practice, the measurement is made graphically, that is, a graph is made of the signal picked up by the probe as it is moved along the slotted line, and this graph is examined for periodic fluctuations, as distinguished from random fluctuations. The periodicity of the fluctuations being sought can be determined by the simple and well-known technique of taking measurements with the line shorted, which produces mostly off-scale readings except at or near the zero crossing point, which thus can be easily determined and graphically noted. It is apparent that in such a technique, if power instability were allowed to enter as a factor, it would still further complicate the problem of selecting the periodic from the random fluctuations, since it would introduce further random fluctuations and make successive runs of the same line show differences which would be very difficult to evaluate. The dual channel technique above described, since it reduces power output fluctuations, to all intents, to a negligible quantity, eliminates the effect of these fluctuations, and is therefore an important factor in the success of the technique. It should be noted that normal power line variations of this type can easily be of greater magnitude than the voltage changes due to the VSWR measurements. Variations in probe voltage due to line irregularities and similar factors, will repeat from measurement to measurement; and therefore can be fairly easily distinguished; however, fluctuations in power output may be entirely at random and therefore cannot be easily recognized. The synchronous detector is also of particular advantage in applying this method, since it distinguishes the directionality of the signals, and therefore enables the positive and negative excursions to be separately identified, which would be much more difficult with a non-directional indicating system, since in that case the effect would appear as a double frequency effect, still further masking the variations which it is sought to distinguish.

FIG. 6 is a schematic diagram showing typical circuitry for the elements shown in block form in FIG. 1, particularly the elements to right of the barretters 4 and 7 in FIG. 1, showing preferred circuitry for these components; however, it will be understood that other forms of conventional circuit design could also be employed, although the form shown is especially designed for the present purpose, and is preferred. The square-wave modulated R.-F. source 2 in FIG. 1 may be of conventional design and is not shown in detail.

Figure 3:
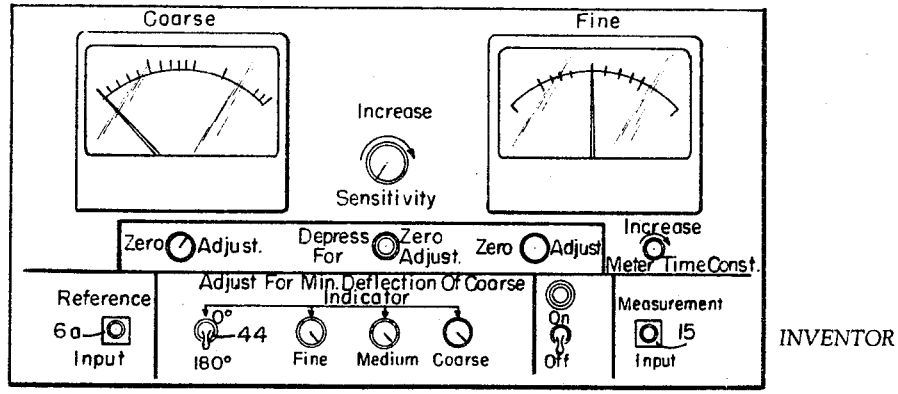
FIG. 3 is a front view of the control panel.

As shown in the front panel view, FIG. 3, two inputs are provided, namely, reference input 4a and measurement input 13a. The reference input corresponds to line 4a of FIG. 1. The reference input is supplied to tube 41, and taken off respectively on leads 42 and 43, which thereby supply outputs 180° out of phase, since they are respectively connected to the anode and the cathode of tube 41. Reversing switch 44 is provided, which merely interchanges the respective outputs with reference to the following circuit, and thereby provides a phase reversal of 180°. These two outputs are now applied respectively to the two grids of vacuum tube 46 which is a double triode. These two grids are therefore supplied with identical signals which are 180° phase displaced so that when one is going positive the other is going negative. The double triode 46 is wired up to provide two cathode followers, which provide stable, undistorted outputs which are essentially duplicates of the signal input to the respective grids, except for a slight reduction in amplitude. The two signals, 180° out of phase, are fed into a bridge-type phase shifter 50. This bridge has a capacitive leg 47 and a variable resistive leg 48, which can be varied in known fashion to provide an output at point 49 which is of constant amplitude, but which can be varied nearly 180° in phase depending upon the adjustment of resistor 48. The reason for this will be apparent from consideration of FIG. 7 and FIG. 8, which show the voltage situation in the bridge, the corresponding voltages being indicated in FIG. 7 to show the components from which they are derived. The voltages under consideration, of course, represent the 1,000-cycle modulating component which is the subject of the measurement. Since the voltages $e_1$ and $e_2$, representing the voltage drops across resistors 51 and 52, respectively, remain constant during the measurement, and the vector sum of voltages $e_5$ and $e_4$ respectively must be equal to the vector sum of $e_1$ and $e_2$, and since further the voltage $e_5$ across the capacitive leg of the bridge must be at 90° with respect to the voltage $e_4$, it will be apparent that the junction point of these voltages from which $e_3$ is derived must lie on a semi-circle and be of constant amplitude. While this arrangement will theoretically provide 180° phase shift, in practice since it is impossible to get a completely short-circuited or open-circuited condition of resistor 48, the obtainable phase shift is usually in the order of 100°. Since it is necessary to cover a full 180°, two such bridges are therefore employed in tandem, providing a second phase shift of the same amount, and therefore more than adequately covering the desired range. The second bridge circuit is similar to the first and corresponding elements are given the same reference numbers with a prime (') added.

The reason for emphasizing the importance of obtaining equal amplitude of output signal vs. phase shift is as follows: If we assume that amplifier 5 in FIG. 1 or amplifier 9 produces a signal which changes phase due to temperature variations, or even worse, and particularly if attenuator 9 output voltage changes with relation to the input voltage, when its attenuators are adjusted, small phase shifts due to this adjustment may occur, providing errors which could not be discovered if the output amplitude of the phase shifter also varied as it was being adjusted. Cathode followers are employed in advance of the phase shifter, because this circuit works well only when it looks into essentially an open circuit load. This is provided by the type of circuit employed. Also, the feed impedance of the phase shifter should appear to be essentially zero. These factors are essentially provided by coming out of cathode follower and working into the grid of an amplifying tube. The present type of circuit will maintain the amplitude constant to within a tenth of a percent over a range of more than 30°.

The phase shifted voltage of the above circuit is supplied to the two-stage amplifier 53, the second stage of which is a highly stable amplifier. This is to ensure that the gain of the entire phase shifter portion of the circuit does not vary appreciably during the time the measurement is being taken. The second amplifier is employed to make up for the loss in gain of the cathode followers, so that it will be possible to have identical signals for producing a balance between the reference input and the measurement input. Resistor 54 also provides a fine adjustment enabling compensation of any further small losses in the preceding portion of the circuit.

We now have at the output of amplifier 53 a voltage of exactly the same amplitude as the input voltage, but one which can have any phase relationship desired with the input voltage.

The signal from this point is fed on line 55 into the difference stage 14, which is shown as an operational amplifier circuit, which, as is well known, has the characteristic of essentially unity gain and almost complete independence of tube characteristics. It also provides practically infinite coupling between what precedes and what follows it in the circuit.

At the output of difference stage 14, which is a cathode follower output (the second half of tube 56), a connection is made at 57 to the unbalance amplifier 16. The input to this amplifier includes a 1,000-cycle filter and a 2,000-cycle trap, the latter being for absorbing the second harmonic component which might introduce error. If a perfect balance has been established by the circuit components previously discussed, the output of difference stage 14 should be zero. In practice however, this cannot be perfectly realized. At the low frequency end there are always traces of 60 and 120 cycle hum, and at the high end it is very difficult to avoid a certain amount of second harmonic distortion. Other harmonics may also exist, but usually the second harmonic is by far the worst offender. In practice, the second harmonic particularly may be sufficiently large to appreciably affect both the coarse and the fine indicators. The combination of series capacitor 58 and shunt capacitor 59 together with inductance 61 is tuned to exactly 1,000 cycles so as to preferentially pass this frequency. This effectively eliminates the low frequency components such as 60-cycle hum and 120-cycle hum, as well as all extraneous low frequency noise components. It is also necessary to greatly reduce the amplitude of the second harmonic component, by as much as a factor of 1,000,000:1. This is achieved by using the same coil 61, which together with parallel condenser 62 is tuned to 2,000 cycles and provides a wave trap for this frequency. This combination provides an effectively very high impedance for 2,000 cycles, in the order of a megohm feeding an impedance at 2 kc. of 2.2 kilohms. Therefore, the output voltage across resistor assembly 64 for 2,000 cycles is reduced to a negligible point. The resulting signal at test point 63 is therefore highly accurate, and when a zero indication appears at this point, it represents a true balance to a very high degree of accuracy. The rest of the unbalance amplifier is a straight R.-C. coupled amplifier, except that it is deliberately made non-linear so that the gain for large signals is reduced and the gain for small signals is increased, so that the characteristic is essentially logarithmic. This enables the unbalance indicator to be adjusted in the correct directions even for large signals, since at least a small swing will be provided on the indicator even for large changes in signal, which would not be the case with a system which is effectively saturated for all but very small signals so that changes in the high signal range could not be observed. This eliminates the necessity for hunting with the circuit adjustment until one accidentally comes close to the zero portion of the scale. This is achieved by using, for example, Thyrite elements as shown at 66 and 67, which are essentially semidiodes having a low resistance for large signals and a very high resistance for small signals. The output of the unbalance amplifier 16 is supplied on lead 68 to unbalance indicator 17 (see also FIG. 1) through any suitable meter circuitry, that shown being merely by way of example. This output is also supplied on lead 18 to synchronous detector 19. The gating pulses for the synchronous detector are supplied on lead 21 (see also FIG. 1) from the square wave shaper and limiter circuits, 23, 24, which may be of any suitable design.

Another factor which interferes with accurate measurements in the above circuit is due to circulating ground currents. These present a problem because of the low level audio signals which are used in the above type of substitution technique. The maximum current which can be used in the effective range of the barretter within which it operates as a square-law detector is that corresponding to a voltage output of approximately 2 millivolts R.M.S. From this point the working range extends down to about 1 microvolt. These voltages must be accurately determined to within approximately 0.1%. Actually, a 0.28% change in audio voltage corresponds to a 0.1 db R.-F. level change, which is the desired accuracy range. As shown at 71 in FIG. 10, a certain amount of 1,000-cycle current will flow in the outer shell of the coaxial cable of the system, and particularly the cable between the R.-F. source and the amplifier 9 of FIG. 1. Since the A.-F. modulating voltage is usually in the order of 100 or 200 volts, and since the R.-F. source must be grounded for safety reasons, while the outer shell of the coaxial cable is also grounded, a certain amount of 1,000-cycle current will circulate in the outer shell of the coaxial conductor. This is due to magnetic induction, electrostatic coupling, etc. This current may be as much as 1 milliampere, and the section of cable from the barretter to the first tube of the amplifier 9 has a certain value of resistance, which may typically be 1 milliohm. The barretter in this circuit functions as a 1,000-cycle output source with an output impedance of 200 ohms in addition to an error source including, in effect, a generator in series with the barretter comprising the outer shield section above discussed, which has, in series with the barretter, a voltage equal to 1 milliampere times 1 milliohm, which equals 1 microvolt. This added to the 100-microvolt output of the barretter may introduce a serious error. It will be noted that both of these signals are coherent and add perfectly since they originate from the same source. This error can be minimized by using special cable or wave guide means having a lower audio conductor resistance than ordinary cable; in addition, it is advisable to still further diminish this error by the use of condensers 72 and 73 as shown in FIGS. 9 and 10. By introducing these capacitors before the barretter, and making them of the value shown, they effectively block 1,000 cycles, while offering little obstruction to the radio frequency. It will be noted that an R.-F. capacitor is placed at both the inner and outer conductor, which tends to block not only 1,000 cycles but also other low frequency noise components. The reason for using two condensers in practice is that for impedance matching purposes a double stub tuner is often employed preceding the barretter, and this is essentially a short circuit device which could provide a sneak path for the low frequency currents. Precautions must be taken to shield the capacitors against unwanted leakage of R.-F. current. A practical construction may be as shown in FIG. 9, where a small button 73a of high K dielectric is interposed directly into the center conductor; the outer conductor may be of flanged construction as shown at 74 with a very thin mica washer interposed 72a between the two flanges (or Teflon, etc.). To avoid R.-F. leakage, the units are screwed together as shown at 76 with phenolic screws or nylon screws, and an outer covering 77 which may be of Teflon tape is wrapped or otherwise fastened around the edges of the flanges, and the entire assembly still further shielded by a metal covering 78. It will be apparent that the same concept can be applied to a conventional wave guide.

To prevent a still further error which might occur due to mismatch, a directional coupler is employed as shown at 70 in FIG. 1a. The power output of the side arm of the directional coupler is proportional to the incident power, assuming a perfect coupler. The R.-F. generator may be considered to always put out its maximum power, but in the case of a mismatch a certain amount of the power is reflected back into the generator and the net useful output is the difference between the two. If there is a mismatch in the reflecting line back to the generator, then still further reflections occur back and forth in the line, which could be a further source of error in the desired measurement. One could artificially change the power output of the generator so that the incident power always remains constant regardless of load change; this essentially provides an artificially matched generator since with respect to the circuit it would behave as a matched generator. If, in a dual channel system, we obtain the reference signal from a directional coupler rather than the usual power splitter, then the reference signal will be proportional to the incident power, due to the inherent characteristic of the directional coupler. The reference channel will now automatically correct for the mismatched impedance of the generator because if the incident power changes, for example, due to a change in load, the audio voltage in the reference channel will go either up or down, depending upon whether the incident power increases or decreases. Therefore, for the purpose of obtaining a balance, the reference channel does not refer back to a total power sample, but only to an incident power sample. Thus the use of a directional coupler tends to eliminate the effect of still another source of error. This expedient can also be employed with advantage in the measuring circuit of FIG. 1 by using the directional coupler to couple the two channels (4, 7 respectively) to the line 2a.

It will be apparent that the embodiments shown are only exemplary and that various modifications can be made in construction and arrangement within the scope of my invention as defined in the appended claims.

I claim:
1. A microwave measuring system comprising
 (a) a stable source of R.-F. voltage in the microwave range modulated at an audio frequency;
 (b) a dual-channel null circuit having two arms fed by said source;
 (c) a detector in each arm for demodulating the R.-F. voltage supplied by said source;
 (d) a differential stage device having two inputs, one from each of said arms, said stage being arranged to mutually oppose said inputs and produce a differential output which is the difference of said two inputs;
 (e) means for balancing said two arms of the null circuit to produce a minimum differential output from said differential stage;
 (f) means for inserting a device to be measured into one of said arms to unbalance said null circuit;
 (g) variable attenuation means in one of said arms for rebalancing said null circuit to again produce a minimum differential output;
(h) relatively low-sensitive meter means connected to the output of said differential stage for measuring the differential output;
(i) adjustable phase-shifter means in one of said arms capable of varying the phase of the voltage in said arm without changing its amplitude;
(j) synchronous detector means having a gating input and a measuring input, said measuring input being also supplied by the output of said differential stage, said gating input being supplied by a signal coherent with one input of said differential stage;
(k) and means in said gating input circuit for shaping and limiting the low-frequency impulses from said phase shifter to provide constant gating pulses at a phase relationship determined by the output of said phase shifter.

2. The invention according to claim 1, said phase shifter means comprising means for shifting the phase at a constant amplitude over a range of at least 360°.

3. The invention according to claim 1, said detector in each arm being a barretter.

4. The invention according to claim 1, said device to be measured being an attenuator device.

5. The invention according to claim 1, said device to be measured being a microwave circuit component, means for measuring VSWR of said component including a slotted line and slider, the output of said slider being supplied to said differential stage as one input thereof.

6. The invention according to claim 5, said slotted line being in one arm of said null circuit, and directional coupler means for supplying the other arm of said circuit from said R.-F. source.

7. The invention according to claim 1, and means in at least one arm of said null circuit for blocking circulating ground currents, said means comprising conductive microwave transmission means, a capacitive element inserted directly into said conductive means colinearly therewith, said capacitive element substantially blocking the flow of low-frequency current along said transmission means.

8. The invention according to claim 1, and means in at least one arm of said null circuit for blocking circulating ground currents, said means comprising coaxial cable means having a central conductor and a coaxial outer conductor radially spaced therefrom, a capacitive element inserted directly into said central conductor colinearly therewith, and another capacitive element inserted directly into said coaxial outer conductor colinearly therewith, said outer conductor being directly grounded on both sides of said second capacitive element.

9. The invention according to claim 1, and a reversing switch in one of said arms for reversing the polarity of the demodulated low frequency voltage supplied to said arm by 180° with reference to the other arm.

10. The invention according to claim 1, said two arms consisting of the sidearm output and mainline output of a directional coupler.

11. The invention according to claim 1 including a filter at the output of the differential stage in order to suppress harmonics of the fundamental audio frequency.

12. The invention according to claim 1 including non-linear means in the output of the difference stage having a higher sensitivity for smaller outputs and a lower sensitivity for higher outputs.

13. The invention according to claim 1 including means providing an adjustable time constant in the output of the synchronous detector.

References Cited by the Examiner

UNITED STATES PATENTS

| | | | |
|---|---|---|---|
| 2,746,015 | 5/1956 | Alsberg | 324—58 |
| 2,929,986 | 3/1960 | Mayes | 324—57 |
| 2,952,296 | 9/1960 | Kofoid | 324—58.5 X |
| 3,104,354 | 9/1963 | Weinschel | 324—58 |

WALTER L. CARLSON, *Primary Examiner.*

A. E. RICHMOND, *Assistant Examiner.*